United States Patent [19]

Gutierrez

[11] Patent Number: 5,004,212
[45] Date of Patent: Apr. 2, 1991

[54] APPARATUS WITH IMPROVED FLOW-THROUGH CHARACTERISTICS FOR THE RECOVERY OF SILVER FROM SILVER-CONTAINING WASTE FLUIDS

[75] Inventor: Carlos D. Gutierrez, Spartanburg, S.C.

[73] Assignee: E. I. Du Pont de Nemours and Company, Wilmington, Del.

[21] Appl. No.: 471,305

[22] Filed: Jan. 29, 1990

[51] Int. Cl.$^5$ .............................................. C22B 3/02
[52] U.S. Cl. ..................................... 266/170; 75/713; 75/733
[58] Field of Search ................... 266/170; 75/713 US, 75/733 US, 713, 733

[56] References Cited

U.S. PATENT DOCUMENTS

| 4,441,697 | 4/1984 | Peterson et al. | 266/170 |
| 4,740,244 | 4/1988 | Williams | 266/170 |
| 4,854,552 | 8/1989 | Williams | 266/170 |

Primary Examiner—Melvyn J. Andrews

[57] ABSTRACT

An improved canister for the recovery of silver from acidic, waste fluids is described. This canister comprises both inner and outer element, each removable from the other, with fitted top and bottom sections. The novel canister thus described, provides a rapid flow of waste material through the system and is efficient and easy to use and manufacture than prior art elements. Plugging of the canisters due to intermittent use is also reduced in the element of this invention.

8 Claims, 2 Drawing Sheets

U.S. Patent  Apr. 2, 1991  Sheet 1 of 2  5,004,212
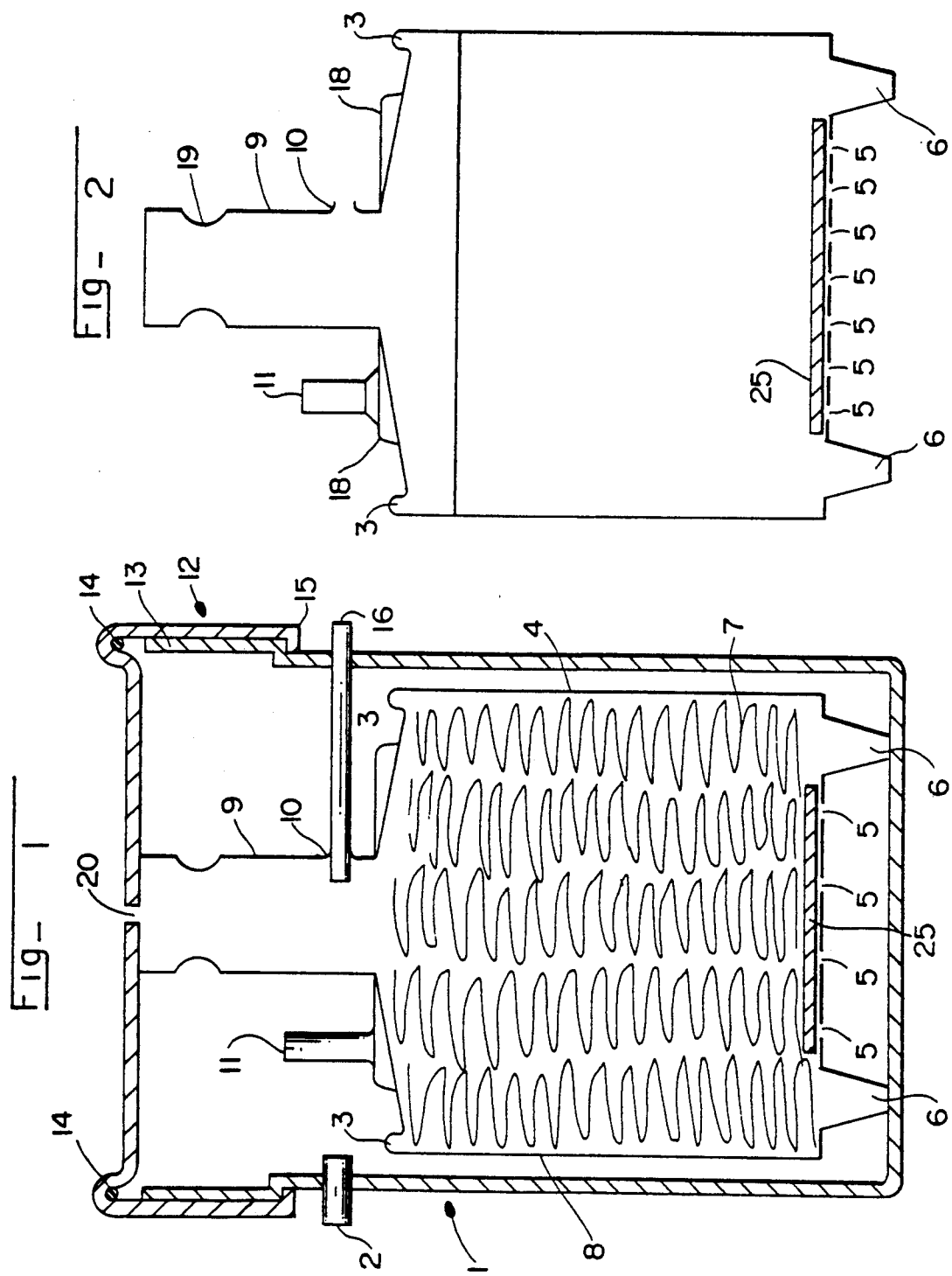

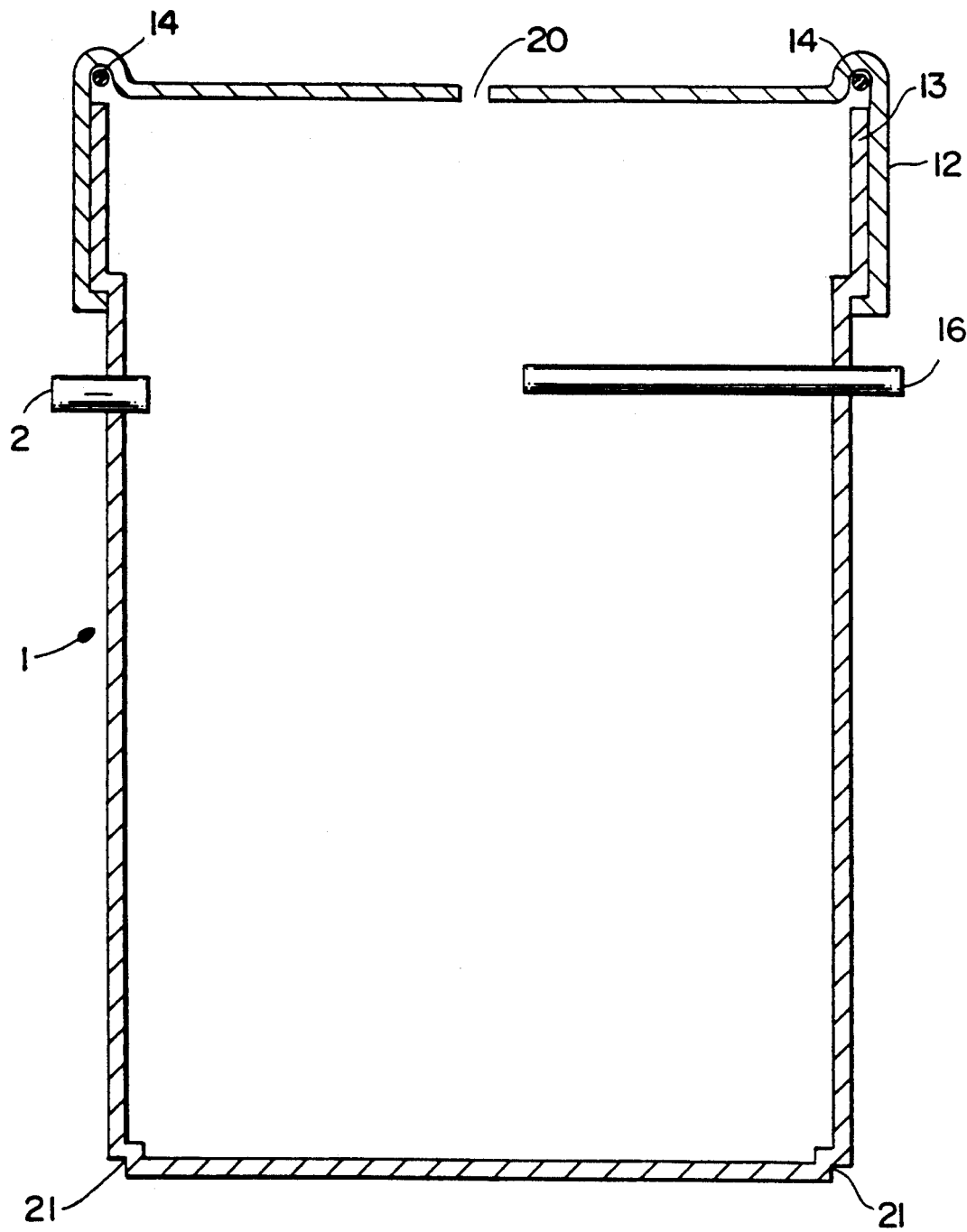

APPARATUS WITH IMPROVED FLOW-THROUGH CHARACTERISTICS FOR THE RECOVERY OF SILVER FROM SILVER-CONTAINING WASTE FLUIDS

BACKGROUND OF THE INVENTION

1. Field of the Invention

This invention relates to the field of silver recovery from silver-containing waste fluids and more specifically, this invention relates to an apparatus with improved flow-through characteristics for achieving this recovery. Still more specifically, this invention relates to an improved apparatus which can be used for recovering silver from spent, photographic fluids such as fixers and developers, one which has a longer service life during use and can recover more silver per unit of use.

2. Description of the Prior Art

There are a host of prior art references which relate to elements useful in recovering silver from spent, waste, silver-containing fluids such as photographic processing fluids. Many of these references describe devices which employ base metals higher in the electromotive series than silver (herein called "media") in order to effect an exchange of silver for some less expensive metal. These prior art devices usually employ some kind of container to contain this media and pass the waste fluids through this container in order to effect this exchange. Improvements to the process are known. In assignee's patent to Williams, U.S. Pat. No. 4,740,244, Apr. 26, 1988, which is incorporated herein by reference, there is described such as improvement. In this case, steel wool as the media, improvement is noted by the addition of small amounts of a copper or cadmium salt present, to this exchange media. In a divisional application of the aforesaid Williams, now issued as U.S. Pat. No. 4,854,552, Aug. 8, 1989, also incorporated by reference, an apparatus for precious metal recovery from these waste, processing fluids, is also described. Graham et al., USSN No. 07/367,394, filed June 16, 1989, the essence of which is also incorporated herein by reference, describes a particularly useful apparatus which is durable and leak proof. These and other prior art references all describe the use of a filler element such as finely divided iron as the exchange media.

Most of these prior art references employ essentially the same apparatus design for containing the exchange media. These designs are usually a container made from some impervious material such as a plastic. The exchange media is placed within this container which also has an inlet and an outlet for the passage of the waste fluid therein. Some of the prior art elements are sealed while others can be opened for re-use and thus this latter device usually has some kind of top. The aforementioned Graham et al. application describes an improved, re-usable device which is tight and leak proof compared to that described elsewhere in the prior art. All of these prior art elements are usually employed to recover silver from waste, photographic processing fluids such as fixers and developers. In this use, they are usually attached to end of processor used to develop and process the photographic films. It is sometimes conventional to use more than one of these devices to insure complete recovery of the precious, silver metal and to insure that essentially no silver is discarded to the drain or sewer lines. Sometimes, the waste processing fluids contains other matter which tends to plug the recovery system. Thus, most of the prior art also have some sort of relief or by-pass device associated therewith in case plugging occurs. Another problem that occurs is leakage. Since the photographic fluids are corrosive, gaskets used to seal the system can be corroded and leaking can occur. Still another problem is space. The industry that uses these automatic film processors usually put these processors in small darkrooms. When it is necessary to use more than one of these recovery devices, there is a crowding problem since most of the prior art elements cannot be stacked conveniently. Plugging in the conventional, prior art canister systems usually occurs when these systems are left standing when the processors to which they are connected are idle, for example. At this point, fluid left in the canister is at a level near the conventional standpipe and deposits are formed therein. When the system is then activated, these deposits impede fluid flow. Most of these problems are solved by the aforementioned Graham et al. application. However, it is also desirable to have a recovery unit with high flow-through characteristics and thus improved time of use. It is also desirable to simplify the construction and manufacture of this units. None of the prior art elements can fully achieve these desired characteristics.

SUMMARY OF THE INVENTION

It is an object of this invention to provide an improved apparatus for the recovery of silver from waste, silver-containing fluids. It is yet another object of this invention to provide a highly efficient, silver-recovering apparatus that has high flow-through characteristics and an improved time of use. These and yet other objects are achieved by providing an improved apparatus for the recovery of silver from waste, silver-containing fluids comprising an outer and inner elements, said inner element being insertable and fitable within said outer element so as to provide space between said inner and said outer elements and where said inner element is placed within said out element, and wherein said inner element comprises a necked top matable to a bottom container, said container having at least one foot elements located on the bottom thereof and having a plurality of holes within said bottom to permit fluid to rise from the bottom to the necked top, said top having an exit mating means and a vent therein, said outer element comprising a top and a bottom, said top having a mating and joining means with said bottom, and said bottom having an inlet and an outlet for said fluid, wherein said outlet connectably joins with said exit mating means in said necked top of said inner element.

BRIEF DESCRIPTION OF THE DRAWINGS

FIG. 1 is cut-away showing of the preferred apparatus of this invention wherein outer and inner elements are connectably joined.

FIG. 2 is a cut-away showing of the inner element of this invention outside the outer element.

FIG. 3 is a showing of an alternative embodiment wherein a stacking means is added to the bottom of the apparatus of FIG. 1.

DETAILS OF THE INVENTION

Referring now specifically to the drawings, FIG. 1 is a cut-away, cross-sectional showing of the preferred improved silver recovery canister apparatus of this invention. In this drawing, silver-containing, waste processing fluid enters outer element 1 through inlet 2 and passes down and around the open area 3 between said outer element and said inner element 4. The fluid then rises through holes 5 in the bottom of said inner element which stands on two feet 6 passing through silver recovery media shown as 7. This media contains metal higher in the electromotive series than silver and completely fills the bottom portion 8 of said inner element. A necked top 9 is shown mated to this bottom portion, said top having an exit mating means 10 and an auxiliary connector 11. The top 12 of said outer element is connected to the bottom 13 through a gasketing means 14 and a mating means 15. An exit for the waste fluid 16 will connect to exit mating means 10 as shown.

FIG. 2 shows the inner element 4 outside of outer element 1. Top reinforcement at 18 is shown along with a vent hole at 19.

FIG. 3 is a showing of an alternative embodiment wherein the bottom 13 of the outer element 1 additionally contains bottom surface notches 21 to permit easy stacking of one element on another. In this showing, for clarity, the inner element is not shown inserted therein.

In practice, the element shown in FIG. 1 is connected to a system from which silver containing waste fluid is passed. Typically, this will be an automatic film processor, for example, in which film is processed and the processing fluids are continually replenished and ejected. This ejected fluid, such as the fixer, for example, is rich in silver which must be recovered. This fluid enters the outer element 1 through 2 and then passes down the open area between the outer and inner elements at 3. The fluid finds a natural course down and around the inner element which sits on at least two feet within said outer element. Holes 5 are provided in the bottom of this inner element. Silver recovery media 5 is dispersed within the lower portion or bottom section 8 of the inner element 4 to fill this area. The waste fluid passes through this media and silver is exchanged therefor. The waste fluid having been stripped of silver then passes through an exit 16 which is mated to a means 10 located in the necked top 9 of the inner element. This stripped fluid is then suitable for disposal or further treatment since essentially no silver remains therein. An auxiliary connector 11 is shown above the exit 16. This connector is normally plugged when used in the configuration shown in FIG. 1, for example. The connector may be used to flush the system after use or to connect subsequent or following recovery units which may be attached, for example. The overflow holes 19 are present to provide for liquid to recycle within the unit if pluggage occurs. A gas vent means 20 is shown as a small hole in the top of the lid of the outer element. This hole may be larger, for example, to provide access for additional recharge of the recovery media or simply for observation as to the completeness of the reaction involved. This access point can be used to add additional media, for example, thus allowing the user to lengthen the time span that the canister of this invention is in place.

This particular canister configuration is extremely useful in the silver recovery business. Since both outer and inner element comprise both top and bottom, it is simple to take this canister apart and re-charge and/or clean the system. A space between the walls of the inner and outer elements permits incoming waste fluid to pass therein. When this fluid reaches the bottom of the inner element, which is raised by at least two feet located thereon, the fluid passes up and through holes located in the bottom of the inner element and goes into the bottom container of the inner element. The sacrificial metal or media, higher in the electromotive series than silver, is contained here and this metal exchanges for the more precious silver, for example. The fluid, stripped of the silver, then rises up into the fluted neck which forms the top of the inner element. Here, a mating means is provided for attaching the outlet from the outer element and the fluid passes through this outlet to waste or further recovery means, for example. A venting means, shown as holes, are also provided in the fluted top. If there is any pluggage within the unit, fluid can recycle out these holes, for example. When it is necessary to change the unit or to recharge same, the inlet and outlet can be disconnected and the unit opened. The top of the inner element can be inter-connected with the top of the outer element so that as this top is removed, the fluted top is also removed, exposing the bottom section thereof. This section contains the silver recovered by this unit and the removal thereof is facilitated since the entire bottom section can be easily extracted from the recovery unit itself. Since this device contains more open space for the waste fluid to enter and pass through the canister of this invention, the rate of flow can be increased thus improving the operability. Another advantage is in the loading capacity of this canister for exchange media. Conventional, prior art devices employed a stand pipe in the middle to pass the fluid. Since there is no pipe here, more exchange media can be charged to this canister thus improving the efficiency.

When the specific configuration shown in FIG. 1 is employed, a plurality of units can be stacked on top of the other and then connected in series, for example. This particular embodiment reduces the floor space required to use the canister systems of this invention. In this embodiment, the bottom surface of the outer element can be notched so when placed on the lid of a second unit, the notches will hold on to the lid and prevent tipping.

In another specific embodiment of this invention, a filter 25 can be placed over the holes 5 in the bottom section 8 of the inner element 4 to filter out any extraneous solids, or other impurities and keep these from entering the area containing the silver recovery media. This filter also prevents iron media and subsequent silver from passing through the holes into the bottom-section and maintains these materials in place. However, it can be conveniently placed in contact with the entry holes and any solids or other waste filtered by this filter media will remain deposited at the bottom of the outer element. The filter element can be any of the conventional, cloth or paper-like materials or synthetics well-known to those of normal skill in the art. It can be attached to the bottom of the inner element by any convenient means such as by gluing, for example. In yet another embodiment, this filter material may be located both inside the bottom of the inner element on top of the holes, and outside over the holes in order to enhance the filtering ability.

Only one foot element 6 is required to hold the inner section up and away from the bottom surface. If a single foot is used, it should be strategically placed so as to prevent the inner section from leaning or tipping, for example. A strategic location can be in the center. Conventionally, however, I prefer using a plurality of foot elements in order to stabilize the inner system.

The outer element of the canister system of this invention is itself unique and simple. The top of this element is connected firmly to the bottom by any conventional, well-known techniques to present a sealed, leak-proof system. The top may be connected by the manner described in the aforementioned Graham et al. application or more simply, as shown in FIG. 1. In this showing, the top seals against the bottom using a gasket arrangement 14 and a snap connection located at 15. Thus, the top of the outer element is simply snapped or pressed on to the bottom as shown. As said before, the fluted top of the inner element may be attached to the top of the outer element for convenience and simplicity. Alternatively, all four pieces of this canister, e.g. top and bottom of both inner and outer elements, may be separate. This simplifies the manufacture of the various parts of the canister of this invention and also helps in the storing and cleaning of these parts. Since all parts can be made by molding plastics, for example, the manufacture thereof is also simplified.

The canister parts, both inner and outer elements, described above, may be manufactured from any material which is not affected directly by contact with corrosive fluids such as fixers and developers. I prefer using polyethylene, for example, since it is particularly inert. Other materials of construction include plastics such as polyvinyl chloride or polyesters, among others, for example. The apparatus of this invention may be made by extruding or molding these plastics or any other methods of thermoforming, for example.

The canister of this invention lends itself to easy stacking when used and thus the utility is enhanced. This is particularly important to users with high film throughput, and hence high developer/fixer replenishment rates, since their needs for silver recovery are high. Thus, it is conventional to use several canisters in line to insure complete removal of the silver. Since floor space is sometimes a problem, stacking is facilitated with the canister of this invention.

The gasket materials which can be used with the elements of this invention can be made from any of the conventionally, well-known type elements. These can be made from rubber or synthetic rubbers, etc. A double gasket may be used if so required.

In yet another mode, both inlet and outlet can be equipped with so-called "quick-connect" devices. Quick-connect devices are well-known elements of the prior art and enable the user to quickly insert or remove hoses from the units with minimal loss of fluid therefrom since there can be check valves within the quick-connects. Since it is sometimes difficult to uncouple a quick-connect device, especially in a dark environment, each of the quick-connects may be accompanied by a device to enhance their removal. For example, a thin, metal device can be fabricated from sheet-stock to help the user with this disconnect. This metal device conventionally will have a "half horseshoe" cut-out on one end. In this instance, the user inserts the cut-out end of the device into the quick-connect to facilitate the use thereof.

Since all of the materials of construction of the elements shown herein are non-corrosive within the conventional operating systems of the prior art, and since the device as shown can be easily opened, cleaned, re-charged and re-closed, it is completely re-useable and thus recyclable. This is also an important point since the recycling of containers is now becoming important in and of itself. Our device is efficient, highly resistant to leaking, space saving, easily used and recycled, has a high fluid through-put and a high media loading capability. Additionally, it is easily manufactured from simple parts and there presents a clear advantage over those prior art canisters.

What is claimed is:

1. An improved apparatus for the recovery of silver from waste, silver-containing fluids comprising outer and inner elements, said inner element being insertable and fitable within said outer element so as to provide space between said inner and said outer elements when said inner element is placed within said outer element, and wherein said inner element comprises a necked top mated to a bottom container, said container having at least one foot element located on a bottom portion and having a plurality of holes within said bottom portion to permit fluid to rise from the bottom portion to the necked top, said top having an exit mating means and a gas vent therein, said outer element comprising a top section and a bottom section, said top section having a mating and joining means with said bottom section, and said bottom section having a fluid inlet and a fluid outlet, wherein said outlet connectably joins with said exit mating means in said necked top of said inner element.

2. The apparatus of claim 1 wherein said fluted top of said inner element is fitted on said bottom container thereof and a gasketing means is present therein.

3. The apparatus of claim 1 wherein said top of said outer element is snapably fitted on said bottom thereof and a gasketing means is present therein.

4. The apparatus of claim 1 wherein said silver recovery media contains at least 50% by weight of said media of a metal higher in the electromotive series than silver.

5. The apparatus of claim 1 wherein said silver recovery media is finely divided iron containing a minor amount of a metal salt taken from the group consisting of copper and cadmium.

6. The apparatus of claim 1 wherein a filter media is present over said holes of said inner element.

7. The apparatus of claim 5 wherein said finely divided iron is steel wool.

8. The apparatus of claim 1 wherein said bottom of said outer element contains a mating means to provide for the stacking of one apparatus on another.

* * * * *